United States Patent [19]

Mouille et al.

[11] Patent Number: 4,809,931

[45] Date of Patent: Mar. 7, 1989

[54] DIRECTIONAL AND STABILIZING DEVICE HAVING A FAIRED AND SLANTED ANTITORQUE ROTOR AND A DISYMMETRIC "V" EMPENNAGE, AND A HELICOPTER EQUIPPED WITH SUCH A DEVICE

[75] Inventors: René L. Mouille, Aix-en-Provence; Philippe A. Rollet, Velaux, both of France

[73] Assignee: Aerospatiale, Societe Nationale Industrielle, Paris, France

[21] Appl. No.: 62,656

[22] Filed: Jun. 16, 1987

[30] Foreign Application Priority Data

Jun. 16, 1986 [FR] France ............................ 86 08644

[51] Int. Cl.⁴ .............................................. B64C 27/82
[52] U.S. Cl. .............................. 244/17.21; 244/17.19; 244/17.11
[58] Field of Search ................ 244/17.19, 17.21, 17.11

[56] References Cited

U.S. PATENT DOCUMENTS

| | | | |
|---|---|---|---|
| 2,322,715 | 6/1943 | Kloeren | 244/17.19 |
| 2,369,652 | 2/1945 | Avery | 244/17.19 |
| 2,407,327 | 9/1946 | Pitcairn | . |
| 2,630,984 | 3/1953 | Ballauer | 244/17.19 |
| 2,702,084 | 2/1955 | Focke | . |
| 3,506,219 | 4/1970 | Mouille et al. | 244/17.21 |

FOREIGN PATENT DOCUMENTS

2167249 8/1973 France .

Primary Examiner—Galen Barefoot
Assistant Examiner—Rodney Corl
Attorney, Agent, or Firm—Armstrong, Nikaido, Marmelstein & Kubovcik

[57] ABSTRACT

A directional and stabilizing device is provided including a faired antitorque rotor, driven in rotation in a transverse aperture formed in a fairing slanted with respect to the vertical by an angle between 0° and 45°. It also includes a "V" empennage fixed to the top of the fairing and the two aerodynamic surfaces of which extend disymmetrically with respect to the vertical plane passing through the top of this fairing, the aerodynamic surfaces being slanted in angular planes between 0° and 45°.

13 Claims, 4 Drawing Sheets

DIRECTIONAL AND STABILIZING DEVICE HAVING A FAIRED AND SLANTED ANTITORQUE ROTOR AND A DISYMMETRIC "V" EMPENNAGE, AND A HELICOPTER EQUIPPED WITH SUCH A DEVICE

BACKGROUND OF THE INVENTION

1. Field of the Invention

The present invention relates to a directional and stabilizing device for an aircraft with rotating wings having at least one rotor, which, in lift rotor configuration, is driven mechanically in rotation by at least one engine while absorbing the drive power at least partially, and such that the fuselage of the aircraft is subjected to the reaction of the drive torque driving the lift rotor, this reaction being compensated for by the device of the invention.

The aim of the present invention is more precisely to provide a directional and stabilizing device intended in particular for equipping helicopters having a single or main lift rotor, driven in rotation more particularly by one or several engines supported by the fuselage of the helicopter on which a torque is exerted due to the reaction of the drive torque of the lift rotor and which must be compensated for by an antagonistic torque of the same value.

In order to provide such an antagonistic torque, for a number of years the applicant has equipped his "Gazelle" and "Dauphin" type helicopters with a device known under the name of "Fenestron", and formed of a faired antitorque rotor. This latter includes a variable pitch multiblade propeller which, on the one hand, is mounted coaxially with a small radial clearance in a faired aperture of circular section formed transversally in the lower part of a vertical stabilizer integral with the rear end of a tail boom extending the fuselage of the helicopter rearwardly and, on the other hand, driven in rotation about the axis of the aperture, which is substantially perpendicular to the vertical plane of symmetry of the aircraft. The multiblade propeller is supported by an auxiliary gear box which is itself held in the aperture by rigid arms and which includes a set of bevel gears driving the propeller and itself receiving the drive movement from a transmission shaft which passes radially through the aperture and is connected to an output of the main gear box. The pitch of the blades of the propeller may be modified without action from the pilot by a servo-control also supported by the auxiliary gear box and actuated by a pitch control link which passes radially through the aperture and is connected by a linkage and/or cables to the rudder bar operated by the pilot of the helicopter. When the pilot gives a positive pitch to the blades of the propeller, the rotation of the propeller in the aperture, which is widened out in its inlet section, on one side of the vertical stabilizer, and which is slightly divergent as far as its outlet section, on the other side of the stabilizer, produces a transverse aerodynamic thrust which is exerted in the direction opposite the direction of air flow through the aperture, and this thrust develops on the fuselage, with respect to the axis of the main rotor, a moment opposing the drive torque of the main rotor, the transverse thrust developed by the faired rotor thus fills the antitorque function in stationary flight, whereas in forward translational flight, the antitorque rotor is gradually set by the pilot to a substantially zero pitch and the antitorque function is then fulfilled to a large extent by a lateral aerodynamic thrust which develops, proportionally to the square of the speed of movement, on the upper part of the vertical stabilizer, which is equipped with an aerodynamic profile having a camber and, possibly, a twist, and which is therefore shaped as a lift wing.

In stationary flight as in translational flight, yawing of the helicopter is controlled by a control variation of the thrust of the faired antitorque rotor, about its position corresponding to balancing of the drive torque.

With respect to the conventional arrangement of helicopter antitorque rotors, which includes a free rotor of a larger diameter than the faired rotor equipped with variable pitch blades and mounted for rotation in a substantially vertical plane about a transverse axis supported laterally by a pylon integral with a rear end of the tail boom, so as to generate, in all the stationary or translational flight configurations, a variable lateral force compensating for the reaction of the drive torque of the lift rotor and allowing the aircraft to be piloted when yawing, the advantages of the faired antitorque rotor are considerable, numerous and well known. Conventional tail rotors, especially on low tonnage helicopters, are very vulnerable to stones and gravel projected by the slip stream of the main rotor, close to the ground and on the ground, as well as with respect to bushes, branches and the ground itself, in the case of nose up landings, and they form a permanent danger for the ground staff. In flight, conventional rear rotors operate in a difficult environment and under poor aerodynamic conditions, and they are subjected to severe stresses and to dynamic phenomena which may be unstable, particularly at high forward translational movement speeds, since they are subjected not only to the relative wind but also to the slip stream and to the vortices caused by the main rotor, and the fuselage, and since there is interference between the antitorque rotor and the rear stabilizer of these helicopters reducing the efficiency of the assembly. In addition, the structure of conventional rear rotors is often complex and fragile, with flapping hinges subjected to high centrifugal forces coming from the blades and requires, for these different reasons, considerable maintenance and periodic replacement of numerous components of limited life or low potential between overhauls.

On the other hand, the faired antitorque rotor eliminates any risk of accidents for the staff and is itself protected from impacts with external obstacles, or with the ground during approaches and landings with the nose too far up. The faired rotor offers better aerodynamic efficiency and very substantially reduces the total aerodynamic drag of the aircraft at high speeds, whence a slightly lower consumed power in forward translational flight at high speed, and the possibility of reaching high speeds without excessively stressing the rotor components. In fact, at high translational speeds, since the pitch of the blades is practically zero, the blades and their control means only undergo very low alternate stresses, and the assembly of the antitorque rotor and the transmission which drives it only supports a low load, and should the faired antitorque rotor fail, the helicopter may come back to base in translational flight, without having to make an emergency autorotation landing, as is the case if the helicopter is equipped with a conventional antitorque rotor. Moreover, the low stress level in the blades in service and the elimination of the risk of instability of the rotor, because of the good flexional and torsional rigidity of the short blades of the faired rotor, mean that the lifespan of the blades is theoretically infinite. Furthermore, faired antitorque rotors, such as those fitted by the applicant to high light helicopters, require at the foot of each blade, neither flapping hinge, nor drag hinge, but only a pitch hinge which, considering the low radial loads to which it is subjected, and because the centrifugal axial loads of the blades are transmitted to the hub by a torsional member, it may be formed by a plane self lubricated bearing. The result is that the maintenance work on a faired antitorque rotor is considerably simplified.

It is well known that the aerodynamic efficiency of a faired rotor is greater than that of a conventional rotor with a free aperture of the same diameter, this feature is used for reducing the diameter of the faired antitorque rotor with respect to that which would be required for a free rotor, which allows it to be integrated in a vertical fairing of reasonable dimensions and, for equivalent efficiency, and, in stationary flight, to consume substantially no more power than a free aperture rotor.

In addition, although the combination in the same helicopter of a vertical stabilizer with lateral lift and a faired antitorque rotor, constructed in accordance with the French Pat. Nos. 1 593 008, 7820 258 and 83 04 448 of the applicant, advantageously fulfills and antitorque function and stabilization of the yawing helicopter, it on the other hand plays no active role in stabilizing the helicopter during pitching, particularly at high speed.

For this, it is necessary to add to the rear of the helicopter additional horizontal stabilizing surfaces, for example in the form respectively of two horizontal stabilizers, supported by the tail boom, on each side thereof, and just in front of the rear rotor. This results in a substantial increase of the structural mass.

2. Description of the Prior Art

To overcome these drawbacks, the French Pat. No. 2 167 249 of the applicant has already proposed fitting over the rigidified annular fairing, in which the faired antitorque rotor is housed, a "V" empennage called "butterfly" whose two branches extend above a horizontal plane passing through the top of the fairing housing the faired rotor, and each on one side of a vertical plane passing through this top, the two branches of the "V" empennage, having, on the one hand, mean planes extending symmetrically with respect to each other on each side of this vertical plane but having, on the other hand, aerodynamic lift profiles disposed antisymmetrically with respect to the general longitudinal axis of the helicopter. It has further been proposed that each branch of the "V" empennage has a substantially trapezoidal shape in a plane view and an aerodynamic profile such that an aerodynamic thrust is developed perpendicular to the plane of the empennage branch considered, this profile having a gradually evolutive configuration from the root, where it is symmetrical and thick, towards the end, where it becomes thin, either by remaining of the symmetrical type but with a linear twist about the longitudinal axis of the empennage branch, or by gradually becoming disymmetric with or without a twist about this longitudinal axis of the empennage branch, each of these branches being moreover, in the case of a rapid helicopter, equipped with a mobile trailing edge flap whose deflection is provided in the direction of the general twist of the profile and whose control is paired and coordinated, in a way known per se, with a longitudinal cyclic pitch control of the main rotor, of the helicopter, and only comes into action from a certain value of this longitudinal cyclic pitch.

However, tests carried out on a directional and stabilizing device constructed in accordance with the teaching of the French Pat. No. 2 167 249 have not allowed all the advantageous results expected to be reached.

Furthermore, certain helicopter constructors equipping their aircraft with antitorque rotors of conventional structure have already slanted the plane of rotation of the rear rotors with respect to the vertical, which develops a force component in the vertical direction, this component having the drawback of being permanent (contrary to a faired antitorque rotor which produces no side thrust in cruising flight, for its blades then have a practically zero pitch). Some constructors have also mounted mobile control surfaces on the rear empennages of their helicopters, control of these mobile control surfaces being provided by automatically controlled actuators as a function of the manoeuvers in the air of the helicopter, by means of a processor receiving from numerous sensors information relative to a large number of flight parameters, which are taken into account for determining the angle of deflection of the control surfaces. The major drawback of these constructions is that they lack reliability, and require duplication of their electronic and electronic controls for ensuring the safety of the aircraft.

SUMMARY OF THE INVENTION

The invention provides then a device providing simultaneously the antitorque function and the static and dynamic stabilities of the aircraft about yaw and pitch axes.

For this, the directional and stabilizing device of the invention, of the type comprising in combination:

a faired antitorque rotor, including a multiblade variable pitch propeller mounted, on the one hand, coaxially in a faired aperture of circular section formed transversally in a fairing situated at the rear of the fuselage, and driven, on the other hand, in rotation about the axis of said aperture, and a "V" empennage carried by the fairing housing the faired rotor and having two aerodynamic surfaces disposed in a V, which are joined together at the top of the fairing housing the faired rotor without coming below a horizontal plane passing through this top, wherein in addition, the mean plane of the fairing housing the faired rotor is slanted with respect to the vertical plane of symmetry of the aircraft by an angle situated in an angular range going from 0° to 45°, so that, with a chosen direction of rotation of the faired rotor and a given arrangement of the pitch control of the blades of said rotor—and said blades being controlled at a positive pitch—the resultant thrust along the axis of the faired rotor is directed in a direction such that, on the one hand, the component of said thrust directed parallel to the general transverse axis of the aircraft creates, on the fuselage, with respect to the axis of the main rotor, a moment opposing the drive torque of the main rotor, and, on the other hand, the component of this same thrust parallel to the general vertical axis of the aircraft is directed upwards, each of the two aerodynamic surfaces has a mean plane and the two mean planes extend disymmetrically with respect to the vertical plane of symmetry of the aircraft, the mean plane of the first aerodynamic surface is placed, with respect to the vertical plane of symmetry of the aircraft, either on the side which is opposite that towards which the thrust of the antitorque rotor is directed in stationary flight and forming then with the horizontal an angle situated in an angular range going from 0° to 45°, or on the side to which the thrust of the antitorque rotor is directed in stationary flight and then forming with the horizontal an angle situated in an angular range from 0° to 20°, the mean plane of said second stabilizing surface being always placed with respect to the vertical plane of symmetry of the aircraft on the side towards which the thrust of the antitorque rotor is directed in stationary flight and then forming with the vertical an angle situated in an angular range going from 0° to 45°.

Said first aerodynamic surface has an aerodynamic profile such that, in translational flight, it generates a resultant aerodynamic force with a vertical negative lift component, that is to say directed downwardly.

Said second aerodynamic surface has an aerodynamic profile such that, in translational flight, it generates a resultant aerodynamic force having, on the one hand, a component directed parallel to the general transverse axis of the aircraft in the same direction as the component, along the parallel axis, of the thrust of the antitorque rotor and, on the other hand, a component directed parallel to the general vertical axis of the aircraft, downwardly.

To avoid possible interference between the aerodynamic surfaces and the slip stream of the faired rotor, the distance separating the junction of the two aerodynamic surfaces from the axis of the faired aperture may be at least equal to one and a half times the diameter of said aperture.

This general arrangement has the following advantages:

The faired antitorque rotor participates in the general lift, because of the vertical component of the slanting thrust which it produces and which causes, for equal installed power, an improvement in the lift performances in stationary flight. For example, for a 45° slant of the fairing housing the faired antitorque rotor, the total power gain in stationary flight is about 5%.

It allows a substantial reduction of the radar signature to be obtained by the slant of the aerodynamic surfaces of the "V" empennage, associated with the slant of the fairing in which the aperture of the faired antitorque rotor is formed. In fact, the reflection of radar echos is lower when the surfaces are slanted with respect to the radar emission. This arrangement is advantageous for reducing the vulnerability of modern military helicopters.

It requires practically no extra mass with respect to prior directional and stabilizing devices which perform less well.

Although the slant of the aperture of the faired antitorque rotor results a priori in a drawback which consists in causing coupling in cruising flight between the natural yaw and pitch modes, this coupling may be overcome by a judicious arrangement of the aerodynamic surfaces of the "V" empennage, and in particular of the second aerodynamic surface.

In a first advantageous embodiment, the mean plane of the first aerodynamic surface is horizontal and forms with a mean plane of the second aerodynamic surface an angle greater than 90°. In this case, the first aerodynamic surface placed on the side of the antitorque rotor which is opposite that towards which the thrust of this antitorque rotor is directed in stationary flight, serves as horizontal empennage. Since this aerodynamic surface is placed in a maximum rearward position with respect to the axis of the main rotor, it has then an increased efficiency because of the increased leverage.

In a second advantageous embodiment, the mean plane of the fairing housing the faired rotor is slanted at 45° with respect to the vertical, the mean plane of the first aerodynamic surface being in the mean plane of the fairing housing the faired rotor, and the two aerodynamic surfaces having their mean plane substantially perpendicular to each other. This particular embodiment is advantageous from the constructional point of view, since it consists in slanting by 45° the assembly formed by the faired antitorque rotor and the vertical stabilizer of the present construction which is to be found in the "Gazelle" and "Dauphin" helicopters of the applicant, and implanting another aerodynamic surface substantially perpendicularly on this assembly so as to complete the "V" empennage.

In order to produce a negative lift required for ensuring equilibrium of the aircraft in cruising flight and so as to avoid in particular a longitudinal flight position of the fuselage sloping too much forwardly, the first aerodynamic surface has a camber with upwardly turned curvature and/or a twist law and/or a negative incidence and, in a simplified construction from the structural point of view, this first aerodynamic surface is entirely fixed.

Advantageously, the second aerodynamic surface has a camber and/or a twist law and/or an incidence chosen so as to produce a lateral aerodynamic force fulfilling at least partially the antitorque function in cruising flight of the aircraft, and in a simple embodiment this second aerodynamic surface is also entirely fixed.

But, if it is desired to provide, during all the manoeuvers of the faired antitorque rotor of the aircraft, decoupling of the yawing with respect to the pitching, it is advantageous to provide on the "V" empennage a device providing a lift variation. In a first example, this advantage is obtained by the fact that one of the aerodynamic surfaces is mobile over the whole of its span and is mounted for pivoting about an axis directed along its span while being controlled by a deflection control connected to the control of the pitch of the faired antitorque rotor of the helicopter.

In another embodiment, this advantage is also obtained if one of the aerodynamic surfaces has at least one mobile trailing edge flap, extending over a part of its span, and the deflection of which is controlled by a control connected to the pitch control of the faired antitorque rotor of the helicopter.

Finally, in order to increase the efficiency of the second aerodynamic surface and/or to increase the yaw return, it is advantageous for the first aerodynamic surface, in the case where this latter is substantially horizontal, to have at its end a small profiled aerodynamic plane or "ear" substantially perpendicular to the mean plane of said aerodynamic surface.

The invention also concerns a helicopter equipped with a device such as described above, and including a coordinated arrangement of the control of the pitch of the blades of the faired antitorque rotor with the longitudinal cyclical control of the main rotor so that an increase in the pitch of the blades of the antitorque rotor automatically introduces a compensatory adaptation of the longitudinal cyclical pitch of the main rotor, limiting the longitudinal flight position variations of the fuselage of the helicopter.

BRIEF DESCRIPTION OF THE DRAWINGS

The invention will be better understood and other features and advantages of the invention will be clear from reading the detailed description given below of several embodiments, described by way of non limitative examples with reference to the accompanying drawings in which:

FIG. 2 is a perspective view on a larger scale limited to the directional and stabilizing device of the helicopter of FIG. 1, FIGS. 3a, 3b, 3c and 3d show the evolution of the aerodynamic profiles of the aerodynamic surfaces of the "V" empennage of the device of FIG. 2.

DESCRIPTION OF THE PREFERRED EMBODIMENTS

Figure 1:
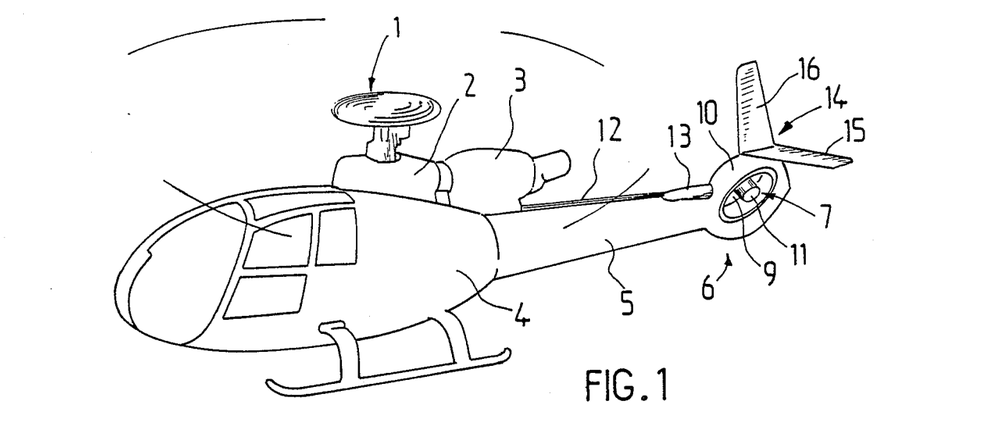
FIG. 1 is a schematical view in perspective of a helicopter equipped, at the end of its tail boom, with a directional and stabilizing device in accordance with the invention.

In FIG. 1 a helicopter has been shown equipped with a single lift rotor, in which the rotor head is referenced at 1, and which is rotated about its axis through a main transmission box 2 and a turbomotor unit 3 supported on the upper part of fuselage 4, which is extended rearwardly by a tail boom 5, whose rear end carries the directional and stabilizing device 6 of the invention.

This device 6, also described below with reference to FIGS. 2 to 4, includes a streamlined antitorque rotor 7, whose structure is not described in detail hereafter for this rotor is constructed in accordance with the teaching of French Pat. Nos. 1 593 008, 78 20258 and 83 04448 of the applicant, and the descriptions of which are incorporated in the present description by reference. For a good understanding of the following description, it should be mentioned that this streamlined antitorque rotor includes essentially a multiblade propeller with variable pitch 8, not shown in FIGS. 1, 2 and 4, so as not to overload the drawings, but shown schematically in FIGS. 5 and 6, and this propeller 8 is mounted coaxially, with a small radial play, in a faired aperture 9, of circular cross section, formed transversely in a relatively thick fairing 10, formed as an annular rigid structure and integral with the rear end of the tail boom 5. In this faired aperture 9, which preferably opens outwardly at its two end sections and is slightly divergent from its inlet section, situated in the right hand lateral face of fairing 10, with respect to the general longitudinal axis XX situated in the vertical plane of symmetry of the helicopter, and to the forward direction of movement of this latter (that is to say at the rear of the plane of FIGS. 1 and 2), to its outlet section, situated in the left hand lateral face of fairing 10 (which face is directly visible in FIGS. 1 and 2), the multiblade propeller 8 is driven in rotation and supported by an auxiliary gearbox 11, itself held in the central part of aperture 9 by support arms (not shown). This auxiliary gearbox 11 includes an angular gear, formed of a pair of bevel gears, one of which is engaged with a shaft of propeller 8, so as to rotate it in the aperture 9, and the other of which receives the rotational movement of the drive shaft 12, which passes radially through the aperture 9 and the structure of fairing 10, and extends as far as an auxiliary outlet of the main gearbox 2, while passing under a profiled cover 13 covering the upper part of the zone at which the tail boom 5 is connected to the fairing 10 (see FIG. 1). Under the casing of the auxiliary gearbox 11 is also housed a mechanism or servomechanism for controlling the pitch of the blades of the propeller and this servomechanism is actuated by a link (not shown) which passes radially through the aperture 9 and fairing 10 and is connected by a linkage and a cable loop to the rudder bar of the pilot compartment, at the front of the helicopter in a way known per se for example from French Pat. No. 2 167 249.

Figure 4:
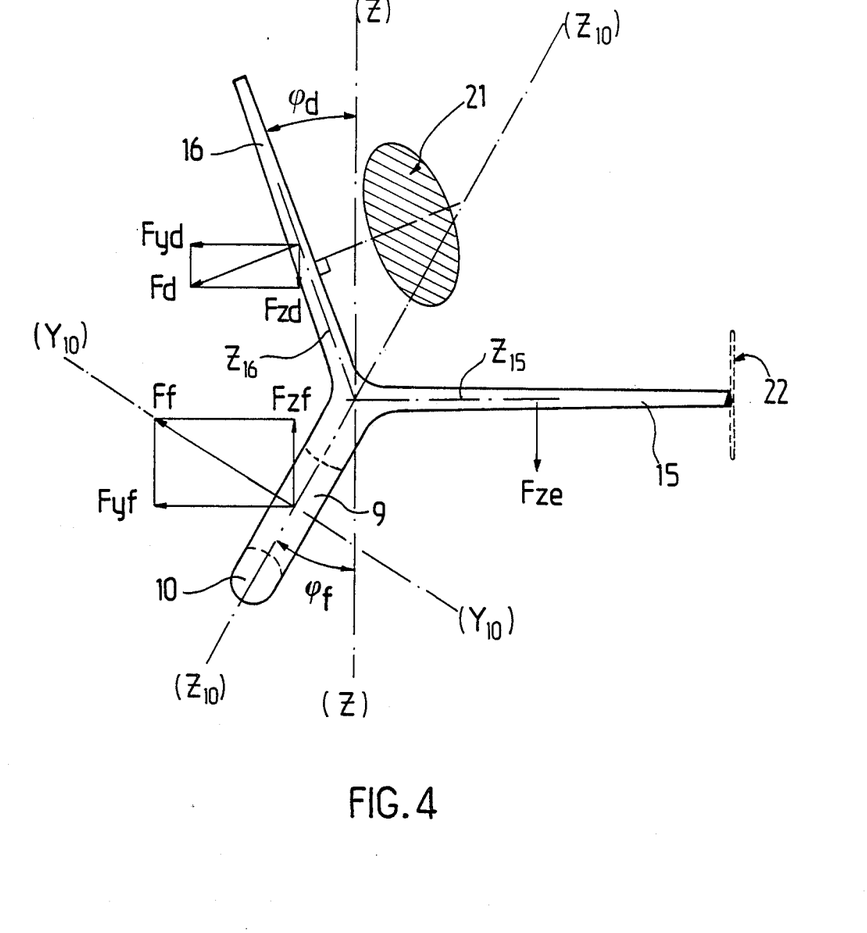
FIG. 4 is a schematical section seen from the front, in the direction of arrows F—F of FIG. 2, of the device.

In accordance with an original technical measure particular to the constructions described in the present description, the mean plane of fairing 10, indicated by its trace Z10 in a plane perpendicular to the general longitudinal axis XX and passing through the axis Y10 of the aperture 9 (which passes close to axis XX), forms with the vertical direction an angle $\phi f$ (see FIG. 4) which is included in an angular zone extending from 0° to 45° and which, in the particular example of FIGS. 1 to 4 is substantially 30°. Thus a faired antitorque rotor 7 is obtained, of the so called "fenestron" type, mounted in a fairing 10 which is disposed at the rear of the tail boom 5 in the extension of fuselage 4, and inclined with respect to the vertical by an angle chosen between 0° and 45°. The direction of rotation of the propeller 8 in aperture 9 and the arrangement of the control of the pitch of the variable pitch blades are such that, for positive pitches of the blades, the propeller develops a thrust Ff, directed along its axis Y10—Y10 and from bottom to top, perpendicularly to the mean plane of fairing 10, as shown in FIG. 4, and in the direction opposite that of the airflow which passes through aperture 9.

In addition to the faired and inclined antitorque rotor 7, device 6 also includes a "V" empennage called "butterfly" 14, that is to say formed of two aerodynamic surfaces 15 and 16 disposed in a V. This empennage 14 is fixed to the top of fairing 10, so that the mean planes of the aerodynamic surfaces 15 and 16, indicated respectively by their trace Z15 and Z16 (see FIG. 4) intersect in the mean plane Z10 of fairing 10, whose top forms the zone where the two aerodynamic surfaces 15 and 16 are joined or connected, which each have a substantially trapezoidal shape in a plane view (see FIGS. 1 and 2). Constructionally, the mean planes Z15 and Z16 do not extend below the horizontal plane passing through their point of convergence at the top of fairing 10, and each of them extends from one side of the vertical trace plane ZZ (see FIG. 4) passing through this point of convergence and, in addition, the mean plane Z15 of the first aerodynamic surface 15 forms with the horizontal direction an angle $\phi e$, included in an angular zone extending from 0° to 45°, whereas the mean plane Z16 of the second aerodynamic surface forms with the vertical direction (Z) an angle $\phi d$ also included in the angular zone extending from 0° to 45° (see FIG. 5).

In fact, and more precisely, the mean planes Z15 and Z16 of surfaces 15 and 16 extend, preferably disymmetrically, one on one side and the other on the other side of the plane bisecting the dihedron formed by the mean plane Z10 of fairing 10 and the vertical trace plane ZZ passing through the top of fairing 10. In the example of FIGS. 1 to 4, the slant angle of the mean plane Z16 with respect to the vertical is substantially 20°, and the slant angle of the mean plane Z15 with respect to the horizontal is 0, so that the first aerodynamic surface 15 extends laterally and horizontally, outwardly of the vertical plane ZZ with respect to the general longitudinal axis XX, to the vertical plane of symmetry of the helicopter, or else on the side of the faired antitorque rotor 7, which is opposite that towards which the thrust Ff of this rotor is directed, for a positive pitch of its blades. The first surface 15 thus fulfills the function of the horizontal empennage associated with antitorque rotors of "fenestron" type of the state of the technique.

Figures 2, 3A, 3B, 3C, 3D:
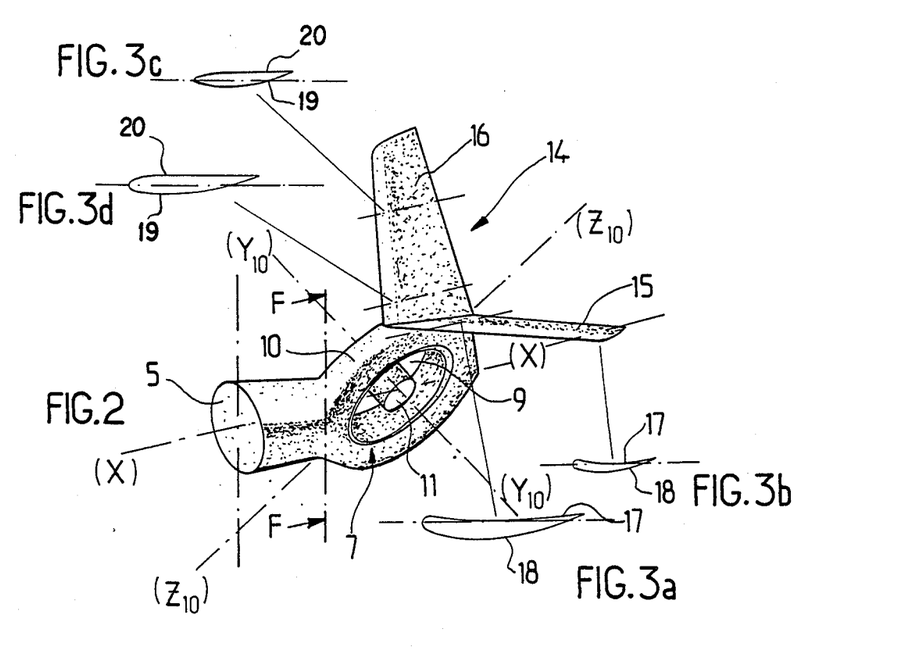

In addition, this aerodynamic surface 15 is cambered, as shown in FIGS. 3a and 3b which show the evolution of the aerodynamic profile of surface 15 and show two cross sections of this latter respectively in the vicinity of its root from the top of fairing 10 and in the vicinity of its free end. These FIGS. 3a and 3b show that the first aerodynamic surface 15 has over the whole of its span a cambered disymmetric profile, which tapers progressively from the root to the free end, and with upwardly turned curvature, and defined by an essentially concave extrados surface 17 and a convex intrados surface 18, of a smaller radius of curvature than that of the concave part of the extrados surface 17, so as to produce in cruising flight, the negative lift $F_{Ze}$ (see FIG. 4) required for ensuring equilibrium of the helicopter when pitching. It is in fact well known that, on a helicopter, it is desirable to develop negative lift forces at the level of the rear rotor so as to avoid a longitudinal flight position of the fuselage at too great a dive angle to the extent that, when the pilot gives cyclic pitch to the blades of the main rotor for forward translational flight, the main rotor is inclined forwardly and the fuselage assumes a position of equilibrium also forwardly inclined.

To produce the negative lift $F_{Ze}$, the first surface 15 may, in addition to its camber, or in place of it have a setting at a negative incidence and/or a twist law over the whole or part of its span. In the example shown in FIGS. 1 to 4, this surface 15 is entirely fixed, but it is possible for it to be mobile and mounted for pivoting as a single piece over the whole of its span about an axis extending along its span, so as to form a deflectable empennage controlled in incidence by a deflection control installation connected to a computer for automatically modifying the negative lift as a function of the needs.

The second aerodynamic surface 16 is slanted upwardly and on the same side as the faired antitorque rotor 7 towards which the thrust $F_f$ of this rotor is directed, has a positive pitch of its blades.

The cant angle of this surface 16 with respect to the vertical (about 20° in this example) is adjusted so as to eliminate or reduce to an appreciable extent the coupling of the natural yawing and pitching modes which result, in cruising flight, from the cant with respect to the vertical of the fairing 10 and of the faired antitorque rotor 7. In addition, the second surface 16 has a camber, shown in FIGS. 3c and 3d, for producing a transverse aerodynamic force $F_d$ (see FIG. 4) proportional to the square of the advancing speed of the helicopter, whose lateral component $F_{yd}$ provides the whole of the antitorque function, in cruising flight at maximum speed, the faired antitorque rotor then exerting no thrust $F_f$, whence a significant reduction of the drive power consumed.

FIGS. 3c and 3d, which show top view cross sections of the second aerodynamic surface 16, in the vicinity respectively of its root on the top of fairing 10 and its free end, show that this surface 16 has a biconvex disymmetric profile which tapers progressively from its root to its free end, and which is defined by a convex extrados surface 19, whose radius of curvature is greater than that of the intrados surface 20, also convex. In addition, this surface 16 may have a twist law over the whole of its span. The vertical component $F_{zd}$, of the transverse aerodynamic force $F_d$ which develops on this second surface 16 corresponds to a negative lift, whose effects are added to those of the negative lift $F_{ze}$ of the first aerodynamic surface 15 for contributing to the longitudinal equilibrium of the helicopter in cruising flight.

For developing the lateral component $F_{yd}$, providing at least partially the antitorque function, and the negative lift $F_{zd}$, the second aerodynamic yawing surface 16 may have a setting at a suitable incidence in place of its camber, or in addition thereto. In the example shown in FIGS. 1 to 4, this aerodynamic surface 16 is also entirely fixed. But it is possible for this surface 16 to be mounted for movement as a single piece over the whole of its span about an axis extending along its span and is controlled in deflection by a control installation connected to the pitch control of the antitorque rotor, so that operation thereof is controlled automatically during the pitch control of the blades of the antitorque rotor in forward translational flight.

Figure 5:
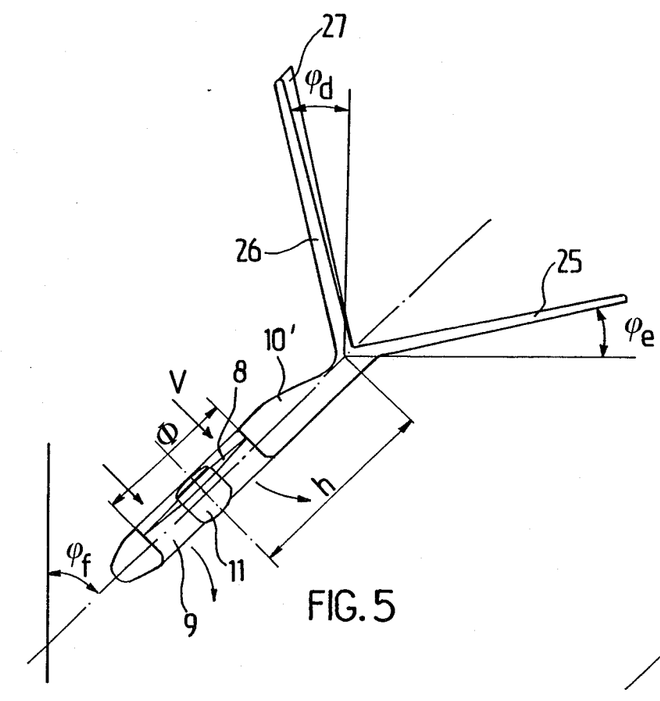
FIG. 5 is a view similar to FIG. 4 of a second embodiment of the directional and stabilizing device.
Figure 6:
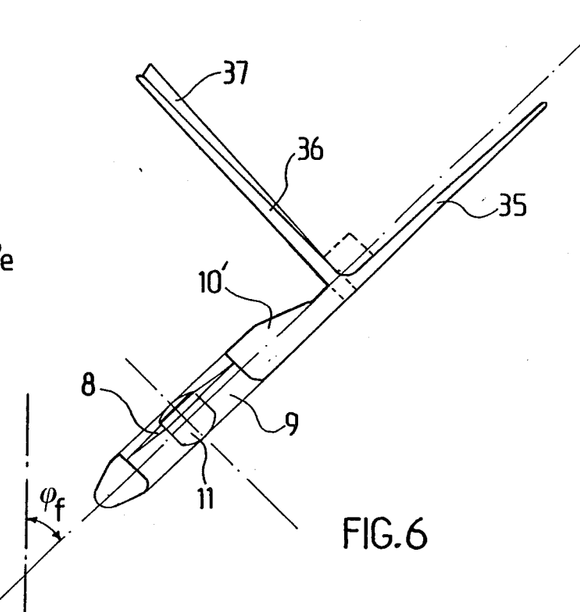
FIG. 6 is also a view similar to FIG. 4 of a third embodiment of the directional and stabilizing device.

Finally, by construction, the distance h (shown in FIG. 5) separating the point of convergence of the two surfaces 15 and 16 from the axis Y 10 of the faired rotor 7 may be greater than or equal to one and a half times the value of 0 (also shown in FIG. 5) of the aperture 9, and that in all the configurations and so also in the examples of FIGS. 5 and 6. This technical measure avoids any possible interference, troublesome at low forward translational speeds of the helicopter, between the wash of the faired antitorque rotor 7 and the airflow over that one of the aerodynamic surfaces 15 and 16 which is the closest to rotor 7.

The stabilizing device described above with reference to FIGS. 1 to 4 operates in the following way:

in stationary flight of the helicopter, the faired antitorque rotor 7 generates a thrust $F_f$ directed along the axis Y 10. Because of the cant of this rotor, this thrust is broken down into a lateral force $F_{yf}$ which provides the antitorque function and a lift force $F_{zf}$ whose value is equal to F sin φ (1), which contributes to the general lift of the helicopter and improves the total power balance of the helicopter, this improvement reaching 4 to 5% if the cant of the bearing 10 is 45°. The pitching-yawing coupling created by the slant of the thrust of the faired rotor is compensated for by a coordinated arrangement of the pitch control for the blades of the faired rotor with the longitudinal cyclic control of the main rotor.

in cruising flight, the major part of the antitorque function is provided by the second aerodynamic surface 16. In fact, the aerodynamic flow over this surface generates a resultant transverse force $F_d$ which, because of the slant with respect to the vertical, is broken down into a lateral component $F_{yd}$ which provides the antitorque function on the helicopter and a vertical component $F_{zd}$ whose value is equal to $F_d$ sin $\phi_d$, forming a negative lift which is added to that produced by the first aerodynamic surface 15.

Adjustment of the cant of the yaw aerodynamic surface 16 with respect to the vertical compensates for the coupling of the natural yaw and pitch modes as well as decoupling of the yaw with respect to the incidence variations.

If $C_y\beta f$ and $C_y\beta d$ represent the lift gradients respectively of the whole of the fairing 10 and of the constant pitch faired antitorque rotor 7 (when the rudder bar is blocked in a position), and of the second surface 16, in the case where the aerodynamic surfaces 15 and 16 are not canted, that is to say in the case where angles $\phi_f$ and $\phi_d$ are zero, and for a slipping variation $\Delta\beta$, return forces are exerted respectively on fairing 10 and on the second aerodynamic surface 16, which are expressed respectively by the following formulae:

$$\Delta F_f = qSf\, C_y^{\beta f}\, \Delta\beta \quad (2)$$

$$\Delta F_d = qSd\, C_y^{\beta d}\, \Delta\beta \quad (3)$$

where q is the dynamic pressure of the moving air, Sf is the lateral area of fairing 10, Sd is the lateral area of surface 16.

When the aerodynamic surfaces 15 and 16 are canted, as is the case in FIGS. 1 to 4, the effective slipping variatio on these surfaces are respectively given by the following formulae:

$$\Delta\beta f = \Delta\beta \cos \phi f \quad (4)$$

$$\Delta\beta d = \Delta\beta \cos \phi d \quad (5)$$

and the return forces are then expressed by the formulae:

$$\Delta\, Fyf = \Delta Ff \cos \phi f = qSf\, Cy\, \beta f\, (\cos^2\phi f)\, \Delta\beta \quad (6)$$

$$\text{and } \Delta\, Fyf = \Delta Fd \cos \phi d = qSd\, Cy\, \beta d\, (\cos^2\phi d)\, \Delta\beta \quad (7)$$

The induced vertical forces $F_{Zf}$ and $F_{Zd}$ are of opposite directions and are equal to:

$$\Delta\, Fzf = \Delta\, ff \sin\phi f = qSf\, Cy\beta\, f\, (\cos\phi f \sin\phi f)\, \Delta\beta \quad (8)$$

$$\Delta\, Fzd = \Delta\, Fd \sin\phi d = qSd\, Cy\beta\, d\, (\cos\phi d \sin\phi d)\, \Delta\beta \quad (9)$$

Perfect decoupling of the pitching with respect to slipping is obtained if:

$$|\Delta Fzf| = |\Delta Fzd|, \quad (10)$$

namely with an angle $\phi$ confirming the following formula:

$$\frac{\sin(2\phi d)}{\sin(2\phi f)} \frac{\phi\, Sf\, Cy\beta f}{=\, Sd\, Cy\beta d}$$

It may readily be shown that decoupling of the yawing with respect to the incidence variations is also obtained with the same angle $\phi d$.

For example, if:

$$\frac{Sf\, Cy\beta f}{Sd\, Cy\beta d} = \tfrac{1}{2} \text{ and if } \phi f = 30° \text{ or } 45°$$

it can be calculated that $\phi d$ is respectively equal to substantially 13° or 15°.

Decoupling during manoeuvering of the helicopter may be obtained by means of a device providing a lift variation either on the first aerodynamic surface 15 or on the second aerodynamic surface 16. This lift variation device may be formed by a stabilizing device with variable setting, as already mentioned above, or by means of a mobile trailing edge flap, mounted for pivoting on the stabilizing surface considered, and whose incidence setting is variable, the lift variation device being, in all cases, slaved to the position of the rudder bar so that:

$$\Delta Fzf + \Delta Fze = 0 \quad (12),$$

which corresponds to a compensation by the first aerodynamic surface 15, or $$\Delta Fzf = \Delta Fzd = 0 \quad (13),$$

which corresponds to compensation by the second aerodynamic surface 16.

In addition, in the case where the lift variation device is mounted on the second surface 16 or is formed thereby, it participates in the yaw control by means of the lateral component $\Delta Fyd$.

In a configuration such as the one shown in FIGS. 1 to 4, attention should be paid to the reinforcement of the attachment of the first aerodynamic surface 15 on the top of fairing 10, because its embedment moment is higher than in a construction such as described in French Pat. No. 2 167 249, because of the arrangement of the surface 15 entirely cantilevered on the same side. In addition, this surface 15 will also have to be more rigid under torsion, so as to avoid the appearance of the aerodynamic phenomenon known as "flutter", which corresponds to an association of aerolastic vibratory phenomena.

The advantages of such a configuration are the following:

the interactions between the different aerodynamic surfaces are small, for the opening angles between these surfaces are very open and, therefore, the interaction drag components are minimum.

The aerodynamic efficiency of such a solution, shown in FIG. 4, is greater than that of a conventional "V" empennage, because the aerodynamic surfaces 15 and 16 are little canted with respect to the yawing and pitching axes, which guarantees good efficiency. In particular, the areas of these surfaces 15 and 16 need practically not be increased, with respect to those of a straight conventional empennage, contrary to the case of the symmetrical "V" empennage, in which the areas must be increased by about 50% if it is desired to obtain the same efficiency as with a straight empennage. In fact, if the angle $\phi d$ is 15°, the area of the corresponding aerodynamic surface 16 must only be increased by $$1 - \frac{1}{(\cos 15)^2} = 7\%$$

The function of the horizontal empennage is provided by the aerodynamic surface 15 which is set further back with respect to the axis of the main rotor than with known solutions in the state of the technique. This surface 15 has then increased efficiency.

The second aerodynamic surface 16 is further from the slip stream of the main rotor, which slip stream is shown schematically by the hatched zone 21 in FIG. 4, whence a better yawing efficiency than with a conventional vertical stabilizer.

In transition flight it is easy to increase the yawing efficiency and/or return of the second aerodynamic surface 16 by mounting, at the free end of the first aerodynamic surface 15 when it is substantially horizontal, an aerodynamic plane 22 (see FIG. 4) substantially perpendicular to its mean plane Z 15 and set with an angle of attack such that a lateral aerodynamic force is created in the same direction as that existing on the second aerodynamic surface 16.

In stationary flight, the side wind produces no lift force disturbing the equilibrium of the pitching helicopter, which is not true with a conventional "V" empennage.

The second embodiment, shown in FIG. 5, corresponds to a less special configuration than the one shown in FIGS. 1 to 4, to the extent that the first aerodynamic surface 25 is no longer horizontal but slanted slightly upwardly, by an angle $\phi e$ with respect to the horizontal between 0° and 45°, and in this example close to 12°. Since the second aerodynamic surface 26 is slanted with respect to the vertical by an angle $\phi d$ close to 16°, we find, as in the preceding example, that the opening angle between the two surfaces of the "V" empennage is greater than 90°. On the other hand, in this second example, the slant angle $\phi f$ of the fairing 10' with respect to the vertical is practically equal to its upper admissible value of 45°. In FIG. 5, the distance h has also been shown separating the axis of aperture 9 and of propeller 8 from the point of convergence of the mean planes of the two surfaces 25 and 26 of the "V" empennage, the diameter $\theta$ of aperture 9, as well as arrows V showing the flow direction of the air passing through aperture 9 because of the rotation of propeller 8, when its blades have a positive incidence. Furthermore, the twist 27 has been shown which surface 26 has throughout its span. Finally, another difference with the first example is that the thickness of the structure of fairing 10' decreases gradually in its upper part while keeping, at its top, sufficient thickness for rigidly joining the two aerodynamic surfaces 25, 26 of the "V" empennage to this top of the structure of fairing 10.

The third embodiment, shown in FIG. 6, includes a faired antitorque rotor and a fairing 10' which are identical to those of FIG. 5 and also slanted through an angle of 45°. On the other hand, the first aerodynamic surface 35 of the "V" empennage is in the extension of fairing 10', and the second aerodynamic surface 36, having a twist 37, is perpendicular to the planes of fairing 10' and of the aerodynamic surface 35. This configuration corresponds, then, to the case where each of the three above mentioned angles is equal to 45°, which is its admissible upper limit value.

This configuration is favorable from the constructional point of view, for it consists in inclining, by 45°, the assembly formed by the faired antitorque rotor and the fairing which houses it in the prior art constructions which at present equip helicopters of the "Gazelle" and "Dauphin" types of the applicant, then in implanting the aerodynamic surface 36 perpendicularly on this assembly, as shown in FIG. 6.

Figure 7:
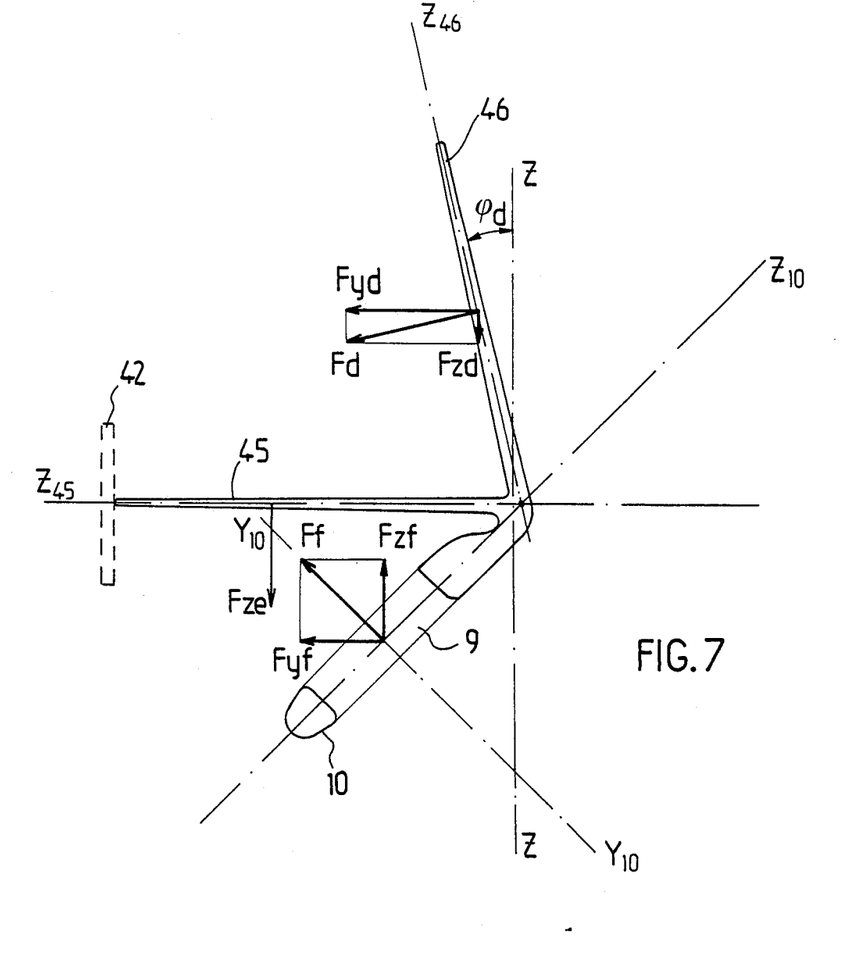
FIG. 7 is also a view similar to FIG. 4 for a fourth example of a directional and stabilizing device.

The fourth embodiment, shown in FIG. 7, includes a faired antitorque rotor, formed of an aperture 9 and a fairing 10, as well as a second aerodynamic surface 46, identical respectively to those of FIG. 4.

On the other hand, the first aerodynamic surface 45 is placed, with respect to the vertical plane of symmetry of the helicopter, on the side towards which the thrust of the antitorque rotor is directed in stationary flight, and forms a zero angle with the horizontal. But this angle could, in variants, be in a range from 0° to 20°.

This first aerodynamic surface 45 may, as in the example shown in FIG. 4, for increasing the yaw efficiency and/or return of the second surface 46 in translational flight, have at its free end an aerodynamic plane 42 substantially perpendicular to its mean plane Z 45 and set with an attack angle such that a lateral aerodynamic force is created directed in the same direction as that existing on the second aerodynamic surface 46.

This fourth general configuration is favorable when, in translational flight, it is desired to use the roll moment formed by the negative lift force $F_{Ze}$ on the first aerodynamic surface 45 with respect to the longitudinal axis of the helicopter for compensating as required the lateral flight position of the aircraft.

In the different possible configurations, the choice of the values of angles $\phi f$, $\phi e$ and $\phi d$ mentioned above follows from the desired characteristics in so far as are concerned, on the one hand, the importance of the contribution of the thrust of the faired antitorque rotor to the general lift of the helicopter and, on the other hand, the more or less accentuated and desired decoupling between the natural pitching and yawing decoupling between the natural pitching and yawing modes of the helicopter. But, in all cases, because of the existencue in stationary flight of a pitching-yawing coupling which results from the slant of the fairing housing the antitorque rotor, this coupling must be compensated for by a coordinated arrangement of the control of the pitch of the blades of the propeller 9 of the antitorque rotor with the longitudinal cyclic control of the blades of the main rotor.

What is claimed is:

1. A directional and stabilizing device for aircraft with rotating wings including at least one rotor which, in lift rotor configuration, is driven mechanically in rotation by at least one engine while absorbing the drive power at least partially, and whose fuselage is subjected to the reaction of the drive torque driving the lift rotor, which reaction must be compensated for, said device being of the type comprising in combination:

a faired antitorque rotor, including a multiblade variable pitch propeller mounted coaxially in a faired aperture of circular section formed transversally in a fairing situated at the rear of the fuselage, and driven in rotation about the axis of said aperture, and a "V" empennage carried by the fairing housing the faired rotor and having two aerodynamic surfaces disposed in a V, which are joined together at the top of the fairing housing the faired rotor without coming below a horizontal plane passing through this top, wherein the mean plane of the fairing housing the faired rotor and the plane of rotation of the faired rotor are slanted with respect to the plane of symmetry of the aircraft by an angle situated in an angular range going from greater than 0° to 45°, the direction of rotation of the faired rotor and the pitch control of the blades of the rotor are arranged so that, said blades being controlled at a positive pitch, the resultant thrust along the axis of the rotor is directed in a direction such that the component of said thrust parallel to the general transverse axis of the aircraft creates, on the fuselage, with respect to the axis of the main rotor, a moment opposing the drive torque of the main rotor, and the component of this same thrust parallel to the general vertical axis of the aircraft is directed upwards, each of the two aerodynamic surfaces has a mean plane and the two mean planes extend on each side of the vertical plane including the general longitudinal axis of the aircraft, the mean plane of the first aerodynamic surface is placed, with respect to the vertical plane, on the side which is opposite that towards which the thrust of the antitorque rotor is directed in stationary flight whereas the mean plane of the second aerodynamic surface is placed, with respect to the vertical plane, on the side towards which the thrust of the antitorque rotor is directed in stationary flight, the mean plane of the first aerodynamic surface forms with the horizontal an angle situated in an angular range from 0° to 45° whereas the mean plane of the second aerodynamic surface forms with the vertical an angle situated in an angular range going from 0° to 45°, said first aerodynamic surface has an aerodynamic profile such that, in translational flight, it generates a resultant aerodynamic force with a vertical negative lift component directed downwardly, and said second aerodynamic surface has an aerodynamic profile such that, in translational flight, it generates a resultant aerodyanmic force having a component parallel to the general transverse axis of the aircraft directed in the same direction as the component, along the same axis, of the thrust of the antitorque rotor and a component parallel to the general vertical axis of the aircraft, directed downwardly.

2. A directional and stabilizng device for aircraft with rotating wings including at least one rotor which, in lift rotor configuration, is driven mechanically in rotation by at least one engine while absorbing the drive power at least partially, and whose fuselage is subjected to the reaction of the drive torque driving the lift rotor, which reaction must be compensated for, said device being of the type comprising in combination:

a faired antitorque rotor, including a multiblade variable pitch propeller mounted coaxially in a faired aperture of circular section formed transversally in a fairing situated at the rear of the fuselage, and driven in rotation about the axis of said aperture, and a "V" empennage carried by the fairing housing the faired rotor and having two aerodynamic surfaces disposed in a V, which are joined together at the top of the fairing housing the faired rotor without coming below a horizontal plane passing through this top, wherein the mean plane of the fairing housing the faired rotor and the plane of rotation of the faired rotor are slanted with respect to the plane of symmetry of the aircraft by an angle situated in an angular range going from greater than 0° to 45°, the direction of rotation of the faired rotor and the pitch control of the blades of the rotor are arranged so that, said blades being controlled at a positive pitch, the resultant thrust along the axis of the rotor is directed in a direction such that the component of said thrust parallel to the general transverse axis of the aircraft creates, on the fuselage, with respect to the axis of the main rotor, a moment opposing the drive torque of the main rotor, and the component of this same thrust parallel to the general vertical axis of the aircraft is directed upwards, each of said two aerodynamics surfaces has a mean plane and the two mean planes extend disymmetrically with respect to the vertical plane of symmetry of the aircraft, the mean plane of the first aerodynamic surface is placed, with respect to the vertical plane of symmetry, on the side to which the thrust of the antitorque rotor is directed in stationary flight whereas the mean plane of the second aerodynamic surface is placed, with respect to the vertical plane of symmetry of the aircraft, also on the side towards which the thrust of the antitorque rotor is directed in stationary flight, the mean plane of the first aerodynamic surface forms with the horizontal an angle situated in an angular range from 0° to 20° whereas the mean plane of the second aerodynamic surface forms with the vertical an angle situated in an angular range going from 0 to 20°, said first aerodynamic surface has an aerodynamic profile such that, in translational flight, it generates a resultant aerodynamic force with a vertical negative lift component directed downwardly, and said second aerodynamic surface has an aerodynamic profile such that, in translational flight, it generates a resultant aerodynamic force having a component parallel to the general transverse axis of the aircraft directed in the same direction as the component, along the same axis, of the thrust of the antitorque rotor and a component parallel to the general vertical axis of the aircraft, directed downwardly.

3. Device according to one of claims 1 or 2, wherein the distance separating the junction of said two aerodynamic surfaces from the axis of the faired aperture is at least equal to one and a half times the diameter of said aperture.

4. The device as claimed in claim 1, wherein the mean plane of said first aerodynamic surface is horizontal and forms with the mean plane of said second aerodynamic surface an angle greater than 90°.

5. The device as claimed in claim 1, wherein the fairing housing the antitorque rotor is slanted at 45° with respect to the vertical, said first aerodynamic surface being in the extension of the fairing housing the faired rotor, and the two aerodynamic surfaces having their mean planes perpendicular to one another.

6. The device as claimed in one of claims 1 or 2, wherein said first aerodynamic surface has a camber with upwardly turned curvature and/or a twist law and/or a negative incidence, so as to produce a negative lift required for ensuring the longitudinal equilibrium of the aircraft in cruising flight.

7. The device as claimed in claim 6, wherein said first aerodynamic surface is entirely fixed.

8. The device as claimed in one of claims 1 or 2, wherein said second aerodynamic surface has a camber and/or a twist law and/or an incidence chosen so as to produce a lateral aerodynamic force providing the antitorque rotor function at least partially for the cruising flight of the aircraft.

9. The device as claimed in claim 8, wherein said second aerodynamic surface is entirely fixed.

10. The device as claimed in one of claims 1 or 2, wherein one of said aerodynamic surfaces is mobile over the whole of its span and it is mounted for pivoting about a pivot axis directed along the span while being controlled by a deflection control connected to the pitch control of the antitorque rotor of the aircraft.

11. The device as claimed in one of claims 1 or 2, wherein one of said aerodynamic surfaces has at least one mobile trailing edge flap extending over at least a part of its span and whose deflection is controlled by a control connected to the pitch control of the antitorque rotor of the aircraft.

12. The device as claimed in one of claims 1 or 2, wherein, in the case where said first aerodynamic surface is substantially horizontal, said first surface has, at its free end, an aerodynamic plane substantially perpendicular to its mean plane, set with an attack angle such that in translational flight it generates a lateral force directed in the same direction as the lateral force of said second aerodynamic surface.

13. A helicopter including a device as claimed in one of claims 1 or 2, including a coordinated arrangement of the pitch control of the blades of the faired antitorque rotor with the longitudinal cyclic control of the main rotor so that increasing the pitch of the blades of the antitorque rotor automatically causes a compensatory adaptation of the longitudinal cyclic pitch of the main rotor, limiting the longitudinal flight position variations of the fuselage of the helicopter.

* * * * *